United States Patent
Alkhabbaz et al.

(10) Patent No.: US 10,606,249 B2
(45) Date of Patent: Mar. 31, 2020

(54) MULTI-VECTOR ENGINEERING METHODS AND APPARATUS FOR ISOLATED PROCESS CONTROL SYSTEMS

(71) Applicant: Saudi Arabian Oil Company, Dhahran (SA)

(72) Inventors: Fouad M. Alkhabbaz, Qatif (SA); Osama Bakur Bahwal, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 48 days.

(21) Appl. No.: 15/923,370

(22) Filed: Mar. 16, 2018

(65) Prior Publication Data

US 2019/0286110 A1  Sep. 19, 2019

(51) Int. Cl.
| | |
|---|---|
| *G05B 15/00* | (2006.01) |
| *G05B 19/418* | (2006.01) |
| *G06F 8/65* | (2018.01) |
| *G06F 9/455* | (2018.01) |
| *G05B 19/042* | (2006.01) |

(52) U.S. Cl.
CPC ........... *G05B 19/4186* (2013.01); *G06F 8/65* (2013.01); *G06F 9/45512* (2013.01); *G05B 19/0428* (2013.01); *G05B 2219/24215* (2013.01); *G05B 2219/31241* (2013.01)

(58) Field of Classification Search
CPC ....................................................... G05B 15/02
USPC ......................................................... 700/275
See application file for complete search history.

(56) References Cited

U.S. PATENT DOCUMENTS

| | | |
|---|---|---|
| 5,586,310 A | 12/1996 | Sharman |
| 7,015,800 B2 | 3/2006 | Lesesky et al. |
| 7,493,140 B2 | 2/2009 | Michmerhuizen et al. |
| 9,699,768 B2 | 7/2017 | Werb |
| 2002/0152053 A1* | 10/2002 | Roy ....................... G01V 1/003 702/185 |
| 2003/0117298 A1 | 6/2003 | Seely |

(Continued)

OTHER PUBLICATIONS

Rigzone, "IoT Technology to Reduce Need for Oil, Gas Workers Offshore", Oct. 14, 2016, Rigzone, pp. 1 (Year: 2016).*

(Continued)

*Primary Examiner* — Suresh Suryawanshi
(74) *Attorney, Agent, or Firm* — Fish & Richardson P.C.

(57) ABSTRACT

The present disclosure describes a new method to virtualize a plant facility with remote sites that are separated from a central site. The method includes: assembling, by a server computer located at the central site of the plant facility, an engineering package addressed to a particular remote site of the plant facility, the administrative package comprising a command script and a data component; and dispatching, by the server computer located at the central site of the plant facility and through a transport network of one or more transport vehicles, the engineering package to the particular remote site such that, when the engineering package arrives with a particular transport vehicle at the particular remote site, the command script is extracted and executed to perform control systems management and engineering tasks at the particular remote site for routine maintenance as if a human control system engineer is present to perform such systems management and engineering tasks on-site.

21 Claims, 15 Drawing Sheets

(56) References Cited

U.S. PATENT DOCUMENTS

| | | | | |
|---|---|---|---|---|
| 2004/0098592 | A1* | 5/2004 | Taki | G06F 21/10 713/176 |
| 2008/0139195 | A1* | 6/2008 | Marsyla | H04W 24/10 455/423 |
| 2008/0274766 | A1* | 11/2008 | Pratt | G01D 21/00 455/552.1 |
| 2009/0037607 | A1* | 2/2009 | Farinacci | H04L 12/4641 709/249 |
| 2011/0296377 | A1* | 12/2011 | Morozov | G06F 8/30 717/113 |
| 2013/0103749 | A1* | 4/2013 | Werth | G06F 9/5072 709/203 |
| 2013/0136597 | A1* | 5/2013 | Hansen | F03D 7/047 416/31 |
| 2013/0212259 | A1* | 8/2013 | Rankov | G06F 9/54 709/224 |
| 2014/0118239 | A1* | 5/2014 | Phillips | G06F 9/452 345/156 |
| 2015/0220321 | A1 | 8/2015 | Jung | |
| 2016/0100437 | A1* | 4/2016 | Armstrong | H04W 4/023 370/249 |
| 2016/0259637 | A1 | 9/2016 | Kumar | |
| 2017/0031840 | A1* | 2/2017 | Cawse | H04W 4/029 |
| 2017/0289812 | A1 | 10/2017 | Werb | |
| 2019/0149894 | A1* | 5/2019 | Weatherhead | H04Q 9/00 |

OTHER PUBLICATIONS

International Search Report and Written Opinion issued in International Application No. PCT/US2019/021330 dated May 31, 2019, 15 pages.

Memon et al., "Distributed control system for process control using intelligent agents," WSEAS Transactions on Systems, retrieved from URL <:https://www.researchgate.net/publication/270214069_Distributed_control_system_for_process_control_using_intelligent_agents>, retrieved on May 17, 2019, available on or before Mar. 1, 2006, 10 pages.

* cited by examiner

300c

| Field | White Listed Packages | | Field |
|---|---|---|---|
| Type | "Active" Package | "Passive" Package | Type |
| Mode 1.A | Advanced Process Control (APC) (i.e. PID controller Logic tuning, set-point manipulation, Process enhancements Signal Validation, Process Tag Update, etc) | Asset Management Requirements, spare parts | Mode 1.B |
| Mode 2.A | System Management (i.e. applying a fix, system patch, firmware update System?) | Security Compliance Assessment | Mode 2.B |
| Mode 3.A | System Operation (i.e. shutting down a device, restarting a device, re-configuration) | SCADA Telemetry & Plant Information (Pi) data | Mode 3.B |
| Security | 128-bit AES Elliptic-curve cryptography (ECC) | | Security |

FIG. 3C

MULTI-VECTOR ENGINEERING METHODS AND APPARATUS FOR ISOLATED PROCESS CONTROL SYSTEMS

TECHNICAL FIELD

This disclosure generally relates to control systems engineering in the context of an industrial plant with remote sites.

BACKGROUND

Gas Oil Separation Plants (GOSP) often operate in remote locations. Additional examples of isolated facilities include remote bulk plants, pump stations and power substations. These remote industrial outposts typically include control systems, instrumentations, field devices and computer installations.

SUMMARY

In one aspect, the present disclosure describes a new method to virtualize a plant facility with remote sites that are separated from a central site. The method includes: assembling, by a server computer located at the central site of the plant facility, an engineering package addressed to a particular remote site of the plant facility, the engineering package comprising a command script and a specialized data component; and dispatching, by the server computer located at the central site of the plant facility and through a non-digital transport network of one or more transport vehicles, the engineering package to the particular remote site such that, when the engineering package arrives with a particular transport vehicle at the particular remote site, the command script is extracted and executed to perform control systems management and engineering tasks at the particular remote site as if a human control systems engineer is present to perform such systems management and engineering tasks on-site.

Implementations may include one or more of the following features.

When the command script is executed, the engineering package may unpack the data component. The data component may encode one or more of: a set-point change, a PID (Proportional-Integral-Derivative) controller tuning command, an OLE (Object Linking and Embedding) for Process Control (OPC) alarm management request, a system update, a security patch, or an update firmware. When the engineering package arrives with the particular transport vehicle at the particular remote site, the command script may be extracted and executed to perform at least one of: pushing instructions or collecting information at the particular remote site by polling controllers or field instruments such as sensors, flow meters and gas leak detectors, and computers at the particular remote site. The method may further include: receiving, by the server computer at the central site, the information collected from the particular remote site. The method may further include: based on the information received, assembling, by the server computer at the central site, an additional engineering package to remedy deficiencies at the remote site as revealed by the information received; and dispatching, by the server computer located at the central site of the plant facility and through the transport network of one or more transport vehicles, the additional engineering package to the particular remote site.

Dispatching the engineering package may include: dispatching, by the server computer at the central site, the engineering package from a fixed relay module at the central site to a mobile relay module mounted on a transport vehicle of the transport network so that the engineering package is offloaded from the mobile relay to the fixed relay as the two relays come in close contact.

Dispatching the engineering package from the fixed relay module to the mobile relay module may be conducted according to either an ISA 100.11a protocol or a WirelessHART protocol. Dispatching the engineering package from the fixed relay module to the mobile relay module may be conducted by transmitting the engineering package from a first IEEE 802.15.4-compatible Direct-Sequence Spread Spectrum (DSSS) radio on the fixed relay module to a second IEEE 802.15.4-compatible Direct-Sequence Spread Spectrum (DSSS) radio on the mobile relay module. Dispatching the engineering package from the fixed relay module and the mobile relay module may include: generating, by the server computer at the central site, a hash value for the engineering package; and attaching, by the server computer at the central site, the hash value to the engineering package being assembled. Generating the hash value may include: performing, by the server computer at the central site, a hash function by using, as hash keys, one or more of: an identification of a manager of the particular remote site, an address of the fixed relay module, an address of the mobile relay module, and an identification of the transport vehicle.

In another aspect, the present disclosure describes a computer system located at a central site of a plant facility and comprising a processor and at least one memory. The processor is configured to: assemble an engineering package addressed to a particular remote site of the plant facility, the engineering package including a command script and a specialized data component; and dispatching, through a non-digital transport network of one or more transport vehicles, the engineering package to the particular remote site such that, when the engineering package arrives with a particular transport vehicle at the particular remote site, the command script is extracted and executed to perform control systems management and engineering tasks at the particular remote site as if a human control systems engineer is present to perform such systems management and engineering tasks on-site.

Implementations may include one or more of the following features. The processor may be further configured to: when the command script is executed at the particular remote site, the engineering package unpacks the data component. The data component may encode one or more of: a set-point change, a PID (proportional-integral-derivative) controller tuning command, an OLE (Object Linking and Embedding) for Process Control (OPC) alarm management request, a system update, a security patch, or an update firmware. The processor may be further configured to: when the engineering package arrives with the particular transport vehicle at the particular remote site, the command script is extracted and executed to perform at least one of: pushing commands or collecting information at the particular remote site by polling at controllers, instruments, field devices and computers at the particular remote site.

The processor may be further configured to: receive the collected information from the remote site. The processor is further configured to: based on the information received, assemble an additional engineering package to remedy deficiencies at the remote site as revealed by the information received; and dispatch, through the transport network of one or more transport vehicles, the additional engineering package to the particular remote site.

The processor is further configured to: transmitting the engineering package from a first IEEE 802.15.4-compatible Direct-Sequence Spread Spectrum (DSSS) radio on a fixed relay module at the central site to a second IEEE 802.15.4-compatible Direct-Sequence Spread Spectrum (DSSS) radio on a mobile relay module mounted on a transport vehicle of the transport network according to either a ISA 100.11a protocol or a WirelessHART protocol. The processor may be further configured to: generate a hash value for the engineering package; and attach the hash value to the engineering package being assembled. The processor may be further configured to: perform a hash function by using, as hash keys, one or more of: an identification of a manager of the particular remote site, an address of the fixed relay module, an address of the mobile relay module, and an identification of the transport vehicle.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

FIGS. 3A-3C illustrate examples of security configurations that allow mobile relays to interact with remote installations according to an implementation of the present disclosure.

Like reference numbers and designations in the various drawings indicate like elements.

DETAILED DESCRIPTION

Figure 1A:
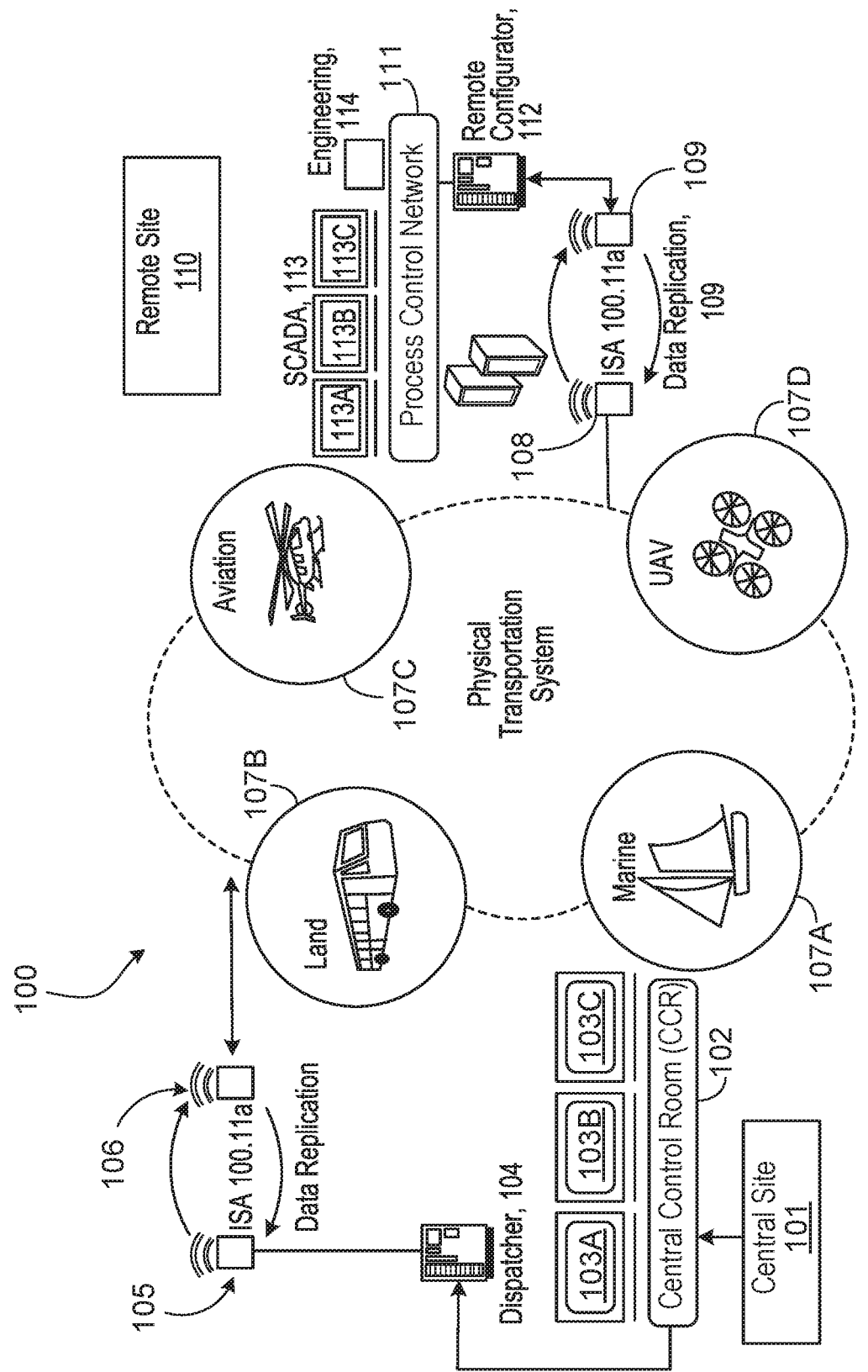
FIG. 1A illustrates an example of a configuration of an engineering architecture involving remote installations according to an implementation of the present disclosure.

A vital part of a Process Control System (PCS) is the ability to provide total engineering, management and control over its remotely located assets including process enhancements, control logic fine tuning and cyber security of its communication infrastructure and system components. For example, Advanced Process Control (APC) simulations are routinely executed to enhance controllers output. In other instances, field devices such as delicate flow measurement devices are in need for timely calibrations. Similarly, computers and network devices may require security checks and inspections. Examples of components of a control system can include Supervisory Control and Data Acquisition (SCADA), Distributed Control System (DCS), Emergency Shutdown System (ESD), and auxiliary systems such as vibration monitoring systems, corrosion monitoring systems, leak detection systems and others. Control systems, as used in this disclosure, can refer to a collection of electronic equipment, including a computer based controller that is used to remotely monitor communication, control the operation of one or more remote relays, meters, transducers, or both. Control systems facilities can be located within a plant facility housing the main Central Control Room (CCR). Control systems for an industrial facility could also be located hundreds of miles away from the main plant facility, for example, near the boarders or in the middle of the sea. Often times, the distance is determined by the industrial facility's proximity to well heads or production and commercial sites, which are beyond the control of owners of these facilities. Such situation presents a real management challenge in keeping these systems optimized, updated and protected against vulnerabilities and cybersecurity threats, in addition to routine information gathering applications such as asset management, security compliance assessments and plant information (PI) historical data.

The disclosure leverages the fact that these sites can be connected by an analog transport mechanism such as helicopter, a bus, or a boat. These analog transport mechanism may be dispatched on a daily or weekly basis to deliver workers (for example, shift operators and technicians), equipment and food supplies as part of the facility's operational requirements. As part of this disclosure, the analog transport mechanisms described in this disclosure are simultaneously utilized (as a dual-function) as an ad-hoc data delivery mechanism by equipping it with specific technology and instrumentation.

In some implementations, Unmanned Arial Vehicle (UAV) can be used as an example of these mobile vehicles equipped with intelligent transceivers that can seamlessly carry custom "engineering package" from a central support center to the isolated facility. By piggy-backing these engineering packages onto these analog transport vehicles, implementations described by this disclosure can remotely run a script to query controllers or field instrumentations or update computer devices, at remote installations automatically without having to establish a dedicated communication network or hire more employees. The "engineering packages" can contain intelligent agents that arrive with analog carriers that are scheduled to visit the remote sites. As the intelligent agents are unpackaged and installed remotely, these agents can perform control systems engineering system management tasks thereby creating a virtual environment for the central control room to interact with remote facilities as if a control system engineer is present on-site for daily and routine engineering and maintenance. Hence, implementations use a "non-digital" transport network to carry a "digital" payload which then can be used to carry out a variety of control systems and management tasks (for example, remote control system and security management) that would otherwise require a dedicated network configuration or a team of human operators.

Figure 1B:
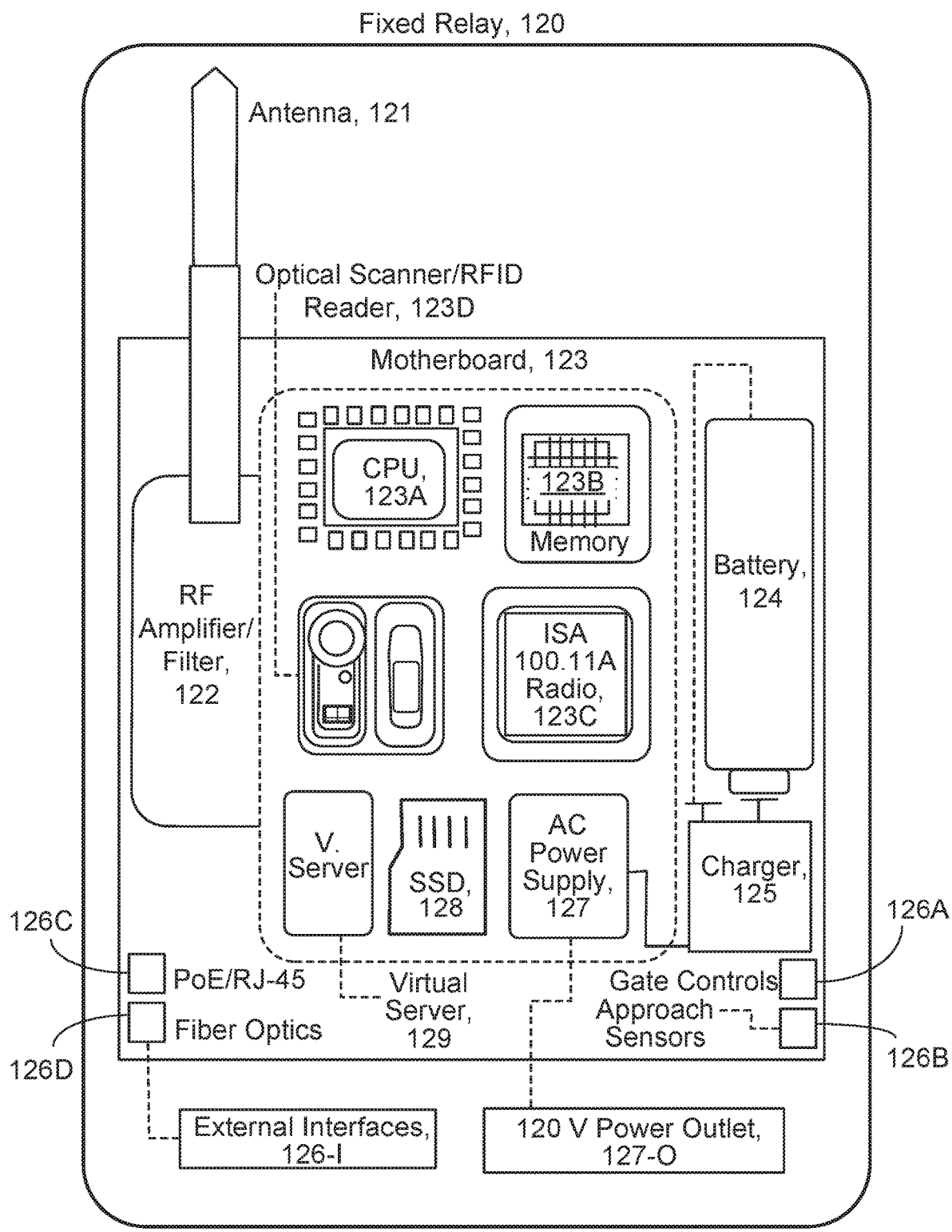
FIGS. 1B and 1C illustrate examples of relay configurations according to an implementation of the present disclosure.
Figure 1C:
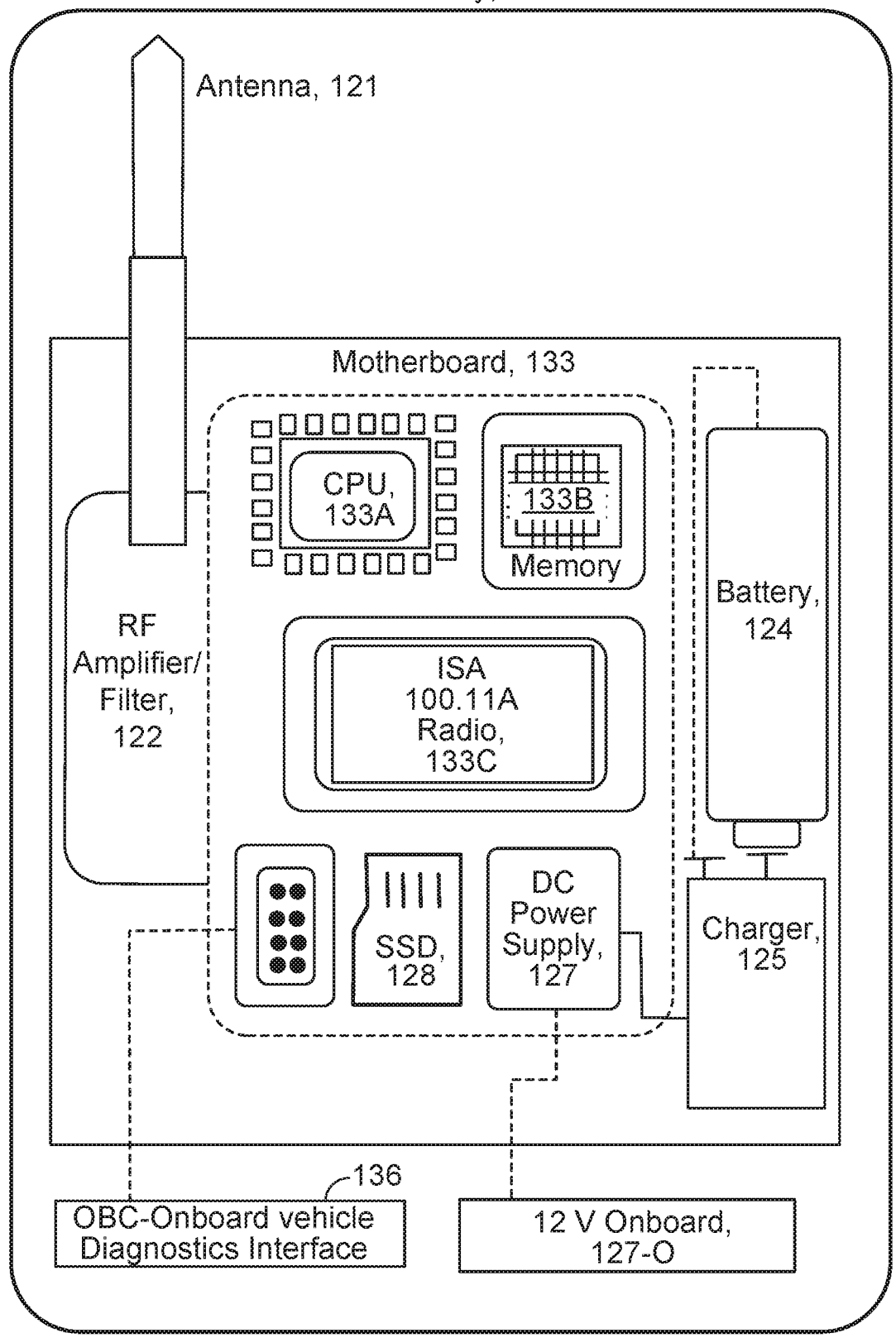

Referring to FIG. 1A-1C, an example 100 of an engineering architecture according to some implementations includes central site 101 and remote site 110. Central site 101 and remote site 110 can be physically separated by large distances, for example, hundreds of miles, when the industrial installation is located near an exploration site.

In one illustration, hiring a fully dedicated and skilled manager per each isolated site to oversee control systems engineering and security administration can be extremely expensive. This highly skilled control systems engineer can sit idle most of the times, thereby becoming disproportionately underutilized. For one thing, the number of control systems nodes and computer systems and the level of complexity tend to less than hundreds. For another, the frequency and the level of control logic optimization and changes for the security policy can be sporadic. Both these factors counsel against hiring dedicating a full time job for such skilled individual. In another illustration, building a dedicated communication infrastructure to tie the isolated remote site 110 with the central site 101 is similarly cost-prohibitive. Isolated sites could be hundreds of miles away from the main support facility. This strategy would easily cost tens maybe hundreds of millions of dollars to build and maintain this secure infrastructure. In this illustration, long haul wireless communication is not viable due to security and performance implications by weather, misalignment, noise and potential jamming. Fiber optics, on the other hand, can be a choice from security and performance perspectives because they are immune to interference and eavesdropping and can deliver good communication speeds over long distances. However, fiber optics are very expensive to construct and maintain because constructing fiber optics requires the use of excavation work and concrete casing, an onerous burden. In yet another illustration, it is economically senseless to fly the central cite support personnel on an as-needed basis to perform the required engineering. To sustain such operations, travel and logistics would include on-demand helicopter rides, boat etc., all of which amounts to nothing but expensive and undesirable overhead.

For context, a set-point for a valve or a sensor as part of PID loop (proportional-integral-derivative controller) may require a change. In process control, a "set-point" refers to a desired value around which plant control and operation are normalized for peak safety and efficiency. For example, it can be a threshold beyond which, a manual intervention (i.e. by an operator action) may be required to normalize operation. A set-point may be abbreviated as SP. When applied to a process value, the term can be abbreviated as PV as part of a control logic implemented in PID (proportional-integral-derivative) controller. Advanced Process Control (APC) processes often monitor a plant's working and operational dynamics, which can change rapidly, to enforce plant efficiency. In another case, changes in the security policy often are small in relative scale, such as the requirement to disable the "Guest" account or disabling USB port or setting up a group policy. In normal environments, such task may only take a few minutes to complete. However, in isolated environment such small task can take "days" to complete, let alone the hefty cost of travel and logistics (including the movement of required equipment) and the extended period when this site is marked as "incompliant," indicating vulnerability. Compounding the annoyances of individual vulnerability is the scale up in organizations with many isolated remote facilities that require physical attendance to resolve security management issues.

Remote site 110 can include a remote Gas Oil Separation Plant (GOSP) that houses plant critical control systems on process control network 111. The plant control system can include controllers, instrumentations and field devices that include operator workstations with Human Machine Interfaces (HMI). The plant control system can additionally include power racks and field wiring cabinets connecting field instruments from the facilities typically isolated in deep desert or in the middle of the sea. Besides Gas Oil Separation Plants (GOSP), other examples of isolated facilities include remote bulk plants, pump stations and power substations. These facilities typically include a small to medium size installation of computer systems (5-20 computers) which could be manned by very few operators from time to time. Because of the distant reach and the lack of a communication network that ties these remote facilities back to the central support site, these facilities are often outdated from "efficient tuned" of operation or cybersecurity policy point of view. But the cost to keep the operational efficiency or security configurations of these remote facilities up to date is disproportionately humongous.

As illustrated, central site 101 includes central control room 102 that may host an array of control computers, including consoles 103A to 103C. Central control room 102 also include dispatcher 104, which can be a server configured to assemble and load engineering packages. The "engineering package" can include a self-executing command script and a "data" component. In one example, the engineering package is passive, indicating that the execution of the package will entail initiating traffic into the network in the form of service requests that would result in a gathering, such as polling, of information from the system configuration, environment or architecture at the remote facility. An example of such polling operation is the collection of alarm or asset management or set-point information from, for example, process control network 111. In another example, the engineering package is active, indicating that the execution of the package will entail initiating traffic into the network that would result in a change in system configuration, environment or architecture at the remote facility. Active packages could be used for activities such as Advanced Process Control (APC) activities such as fine tuning PID controllers, manipulating set-points. Moreover, the active package can be used for network security management and administration, including, for example, adding a user, deleting a group, applying a group policy, or applying a hardening procedure. Additionally, the active package could be utilized to apply a fix or install a system patch or perform a firmware update for a network device or a computer system. The active package can also be used to perform system related operations such as restarting or shutting down a device, or reconfiguring a device. In another implementation, the active package can be used to deliver electronic authorizations to repair systems as in Works Permits (WP) or Management of Change (MoC) systems. The data component, for example, can supply the requisite information used by the active package. Examples of a data component include a system update, a security patch, or an update firmware.

In some implementation, the combination of active and passive engineering packages can be used to bring back emails, office memorandums and correspondents, sales transactions, work processes and electronic images and documentations:

In some implementations, the passive package maybe used to carry back critical system alarms, events flags, power outages, power utilizations curves, thresholds and CCTV images analysis to the central facility that would otherwise will take un-predicted time to be learnt, acknowledged and acted upon.

In another implementation, a virtual Remote Site Database & Dashboard is provided so that a full view of the remote facility is displayed. The virtual site dashboard reflects information that can be used in screening & performance monitoring to identify savings potential and setting priority such as: Low-Grade Heat Utilization (LGHU), Equipment Priority Ranking Assignment (EPRA), Power Generation Potential (PGP) (i.e. by utilizing Low-grade heat, rectifying measurement and instrumentation requirement). Additionally, the virtual site dashboard can provide utilization information for online monitoring and optimization, conduct specific detailed assessment and Control Systems potential efficiency improvement that could generate potential saving of MW (megawatts) of power per a given time period.

In some implementations, the combination of active and passive packages can be used to transmit recorded messages, tabulation of food, medical, cleaning and sanitation supplies needed by facility occupants.

In some implementations, dispatcher 104 delivers the engineering package to a dispatching relay 105. In one example, dispatching relay 105 can include a fixed relay module 120 installed in transport terminals such as a helicopter pad, a bus station, or a marine pier where the fixed relay module 120 communicates with a mobile relay 106 attached to a vehicle. In one example, mobile relay 106 can include a mobile relay module 130.

In these examples, fixed relay module 120 includes industrial wireless radio based on two standards Industry Standard Architecture (ISA) 100.11a and wireless Highway Addressable Remote Transducer Protocol (WirelessHART) with a central processing unit (CPU), memory and a low power Solid State Disk (SSD) storage that has the capacity to support passive and active package distribution, auxiliary data gathering and network and server virtualization. Specifically, fixed relay module 120 includes an antenna 121, an RF amplifier/filter 122, a motherboard 123, a battery 124, and a charger 125. The motherboard 123 further includes a central processing unit (CPU) 123A, a memory 123B, an Industry Standard Architecture (ISA) 100.11a radio 123C, an optical scanner/radio frequency identification (RFID) reader 123D, a gate controls 126A, an approach sensors 126B, a power over Ethernet (PoE)/registered jack (RJ-45) socket 126A, a fiber optics adapter 126D, an alternate current (AC) power supply 127, a solid-state storage device (SSD) 128, and a virtual server 129. The virtualization engine is supported via a dedicated onboard dedicated resources to avoid resource competition process and ensure overall quality of service. AC power supply 127 is connected to a 120V power outlet and provides power to charger 125.

Similarly, mobile relay module 130 includes similar components as in the fixed relay such as industrial wireless radio based on two standards ISA 100.11a and WirelessHART with a central processing unit (CPU), memory and a low power solid state disk (SSD) storage that has the capacity to support passive and active package distribution, auxiliary data gathering. In more detail, mobile relay module 130 includes an antenna 121, an RF amplifier/filter 122, a motherboard 133, a battery 124, and a charger 125. The motherboard 133 further includes a CPU 133A, a memory 133B, and an ISA 100.11a radio 133C, a direct current (DC) power supply 127-O to provide a 12-V supply onboard the vehicle, a solid-state storage device (SSD) 128, and an onboard vehicle diagnostics interface 136. In comparison, mobile relay module 130 does not have the network and server virtualization component. For context, the virtualization engine is only supported on the fixed relay via a dedicated onboard dedicated resources to avoid resource competition process and ensure overall quality of service. The mobile relay module also dos not have the optical scanner, RFID reader, approach sensors this is required to support the gate access control for terminal operation application, a function that is handled by the fixed relay apparatus. However, the mobile relay includes the on-board diagnostics (OBD) reader function that will obtain the carrying vehicle's diagnostics information. In another implementation, the communication between the fixed and mobile relay utilizes specially induced "low power" and "short range" design so that data replication can only occur within, for example, ten (10) centimeters during vehicle's scheduled docking at the terminal.

In another implementations, since a restricted transmission power and range for data transfer and replication over ISA 100.11a and WirelessHART is applied, an additional methodology is provided to facilitate vehicle approach and guidance procedures. The methodology utilizes specially placed proximity sensors that that are connected to the fixed relay via the optical backbone. Upon the detection of initial approach, the system engages the proximity sensors to continuously calculate approach speed, angle and distance of the incoming vehicle (for example, a boat, or a bus) and provide a guiding signals to the captain via connected LED indicators fixed at each docking area.

In another implementation, the guiding information may be fed back to the vehicle's navigation system through the mobile relay providing self-approach mechanism. Since the data involving guiding procedures is considered minimal comprising only three main parameters being approaching speed, angle and distance to docking terminal, the three parameters can be encoded via variation of LED lighting frequency that can be captured and analyzed by the optical sensors. The analysis of LED lighting variations would be mapped into three main parameters being approach speed, angle and remaining distance before docking by the fixed relay terminal.

As illustrated, mobile relay 106 is fitted on a vehicle from physical transportation system 107. Example of the vehicle can include a bus 107A, a boat 10713, a helicopter 107C, or an UAV 1071). Once the vehicle docks at the remote site 110 and comes within 10 cm proximity (transmission distance can be configurable to "plus or minus 50%") with the mobile relay 106 transmits the engineering package to a fixed relay 109 located at the remote site 110. Fixed relay 109 may then pass the engineering package to configurator 108. In some instances, the configurator 108 is a server computer housed as an add-on card part of a PLC or an RTU, which is responsible to execute and implement the engineering package such that the intelligent agent can be installed on process control network 111 that supports components of a control system. Such components can include Supervisory Control and Data Acquisition (SCADA) 113 encompassing parts 113A to 113C. These components can also include engineering system 114 encompassing Distributed Control System (DCS), Emergency Shutdown System (ESD), and auxiliary systems such as vibration monitoring systems, corrosion monitoring systems, leak detection systems and others. The control system may generally include a collection of electronic equipment, including a computer based controller that is used to remotely monitor communication and/or control the operation of one or more remote relays, meters, transducers. In one scenario, the network at remote site 110 can include computers, network equipment, controllers, and field devices. In this scenario, the remote site 110 performs a multitude of functions most of which are "real-time" applications such as controlling the process in gas oil separation plants (GOSPs), controlling the flow of product in pump stations etc. such sites are "manned" by operators 24×7, and thus routine engineering functions are required to be performed on site as well as some data gathering pertaining to the operational wellbeing of the facility. In another scenario, remote site 110 includes a distributed mesh sensors connected to a master data collector such as a remote terminal unit (RTU) or programmable logic controller (PLC). This remote sensor network operates to gather and transmit field status periodically. The remote site is "unmanned" and requires no routine administration. Such installations can be, for example in collection of well head valve position indication, water injection, pipeline leak detection systems and corrosion monitoring systems.

In some implementation, the RTU function can be imbedded into the fixed relay that is connected to the remote site, so that commands are dispatched and field telemetry can be carried back to the central SCADA system on regular intervals. The RTU function can be implemented because the fixed relay is already equipped with computing power & storage, supports WirelessHART and maintains permanent connectivity with the remote site control systems network.

In another implementation, the mobile relay could house a vibrating component that can be used to issue specific commands. The vibration is induced as current runs through a small motor built with an improper weight distribution attached to its shaft, so when the motor rotates, the irregular weight causes the motor to vibrate. Specific series of vibration frequencies and amplitudes are detected by a vibration monitoring sensor mounted on the fixed relay as the two relays come in close contact. The fixed relay maps each detected vibration to a specific command that the system will execute at particular point in time. The fixed relay measures the changes (in amplitude and frequency) in vibration flux (f) per period of time (t) and execute a pre-programmed command that matches the flux signature, such as putting a sensor in "reset", "program" or in temporary "disable" mode. The bursts of induced vibration are in accordance with an algorithm that is both known to the mobile and fixed relay. Using vibration as a command issuing methodology is used in the event the mobile relay detects an abnormal electromagnetic distortion that can be taken as a result of external signal jamming source.

In another implementation, the mobile and the fixed relay use the ISA 100.11a radio to transmit commands while using WirelessHART to transmit the data portion or the combination of both. In some instances, a direct wire harness, or a fiber optic harness can be used for data and command synchronization between the mobile and the fixed relays.

Figure 2A:
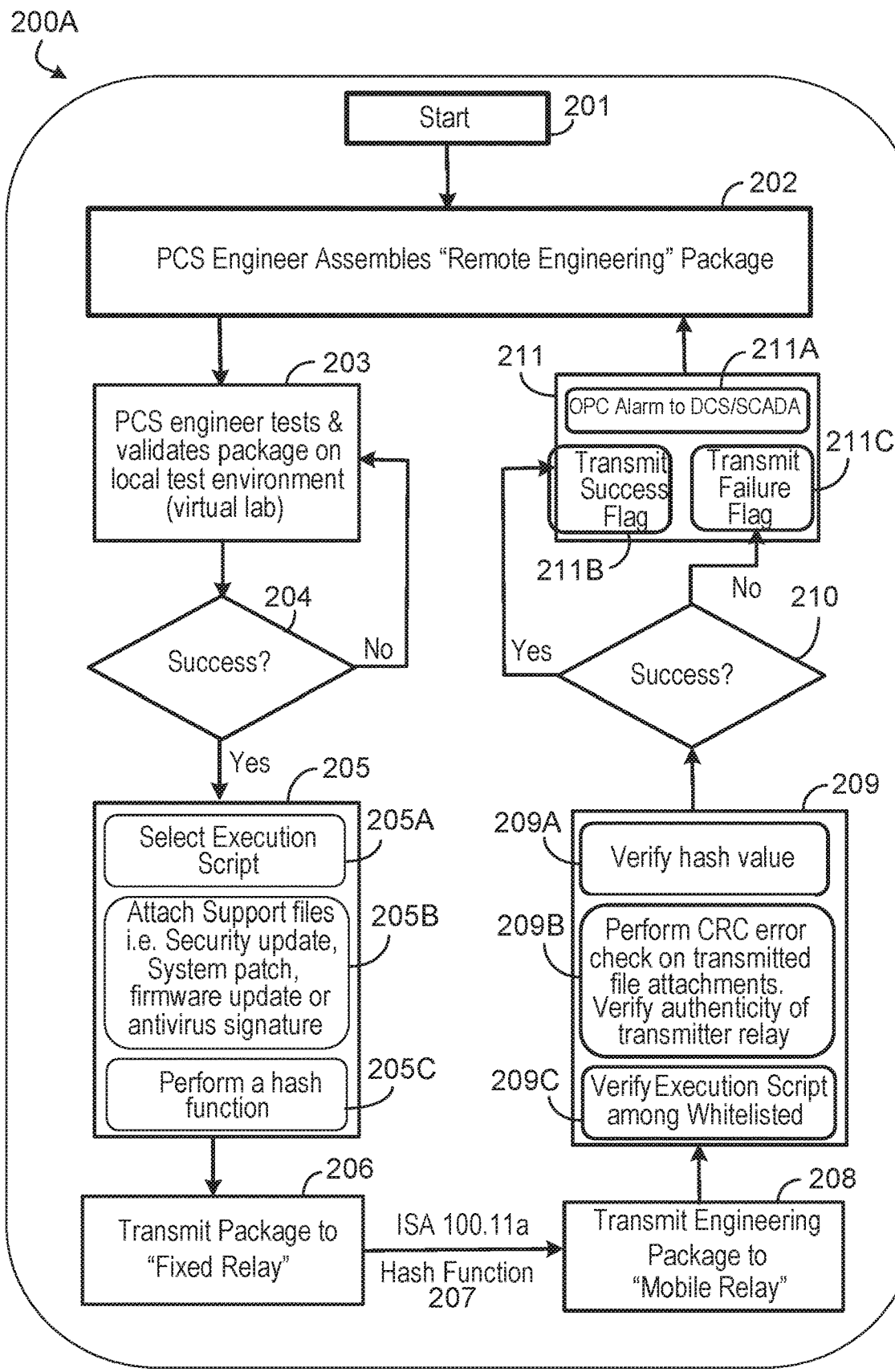
FIGS. 2A and 2B are flow charts illustrating examples of remote engineering to virtualize control systems management for remote installations according to an implementation of the present disclosure.
Figure 2B:
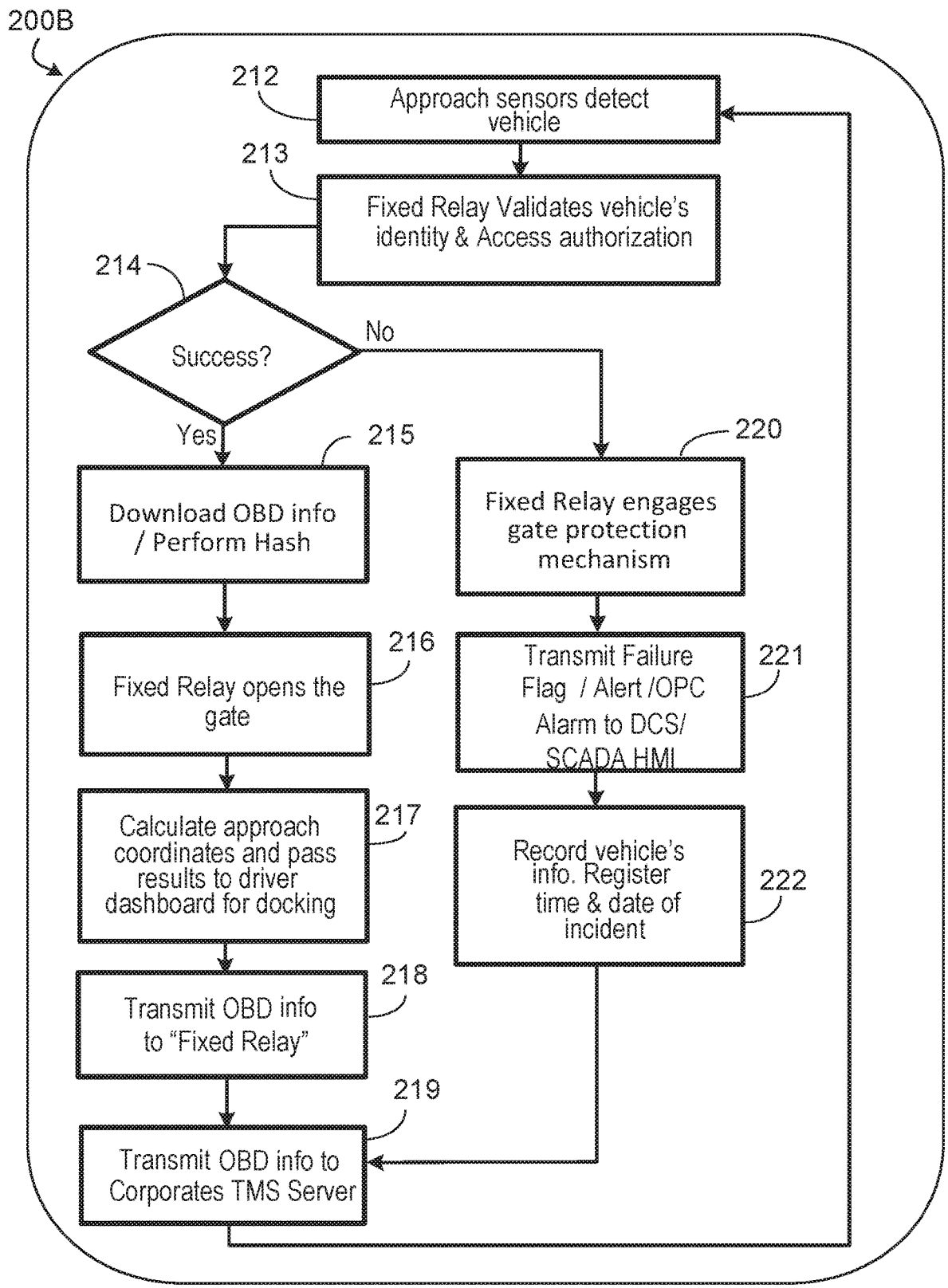
Figure 3A:
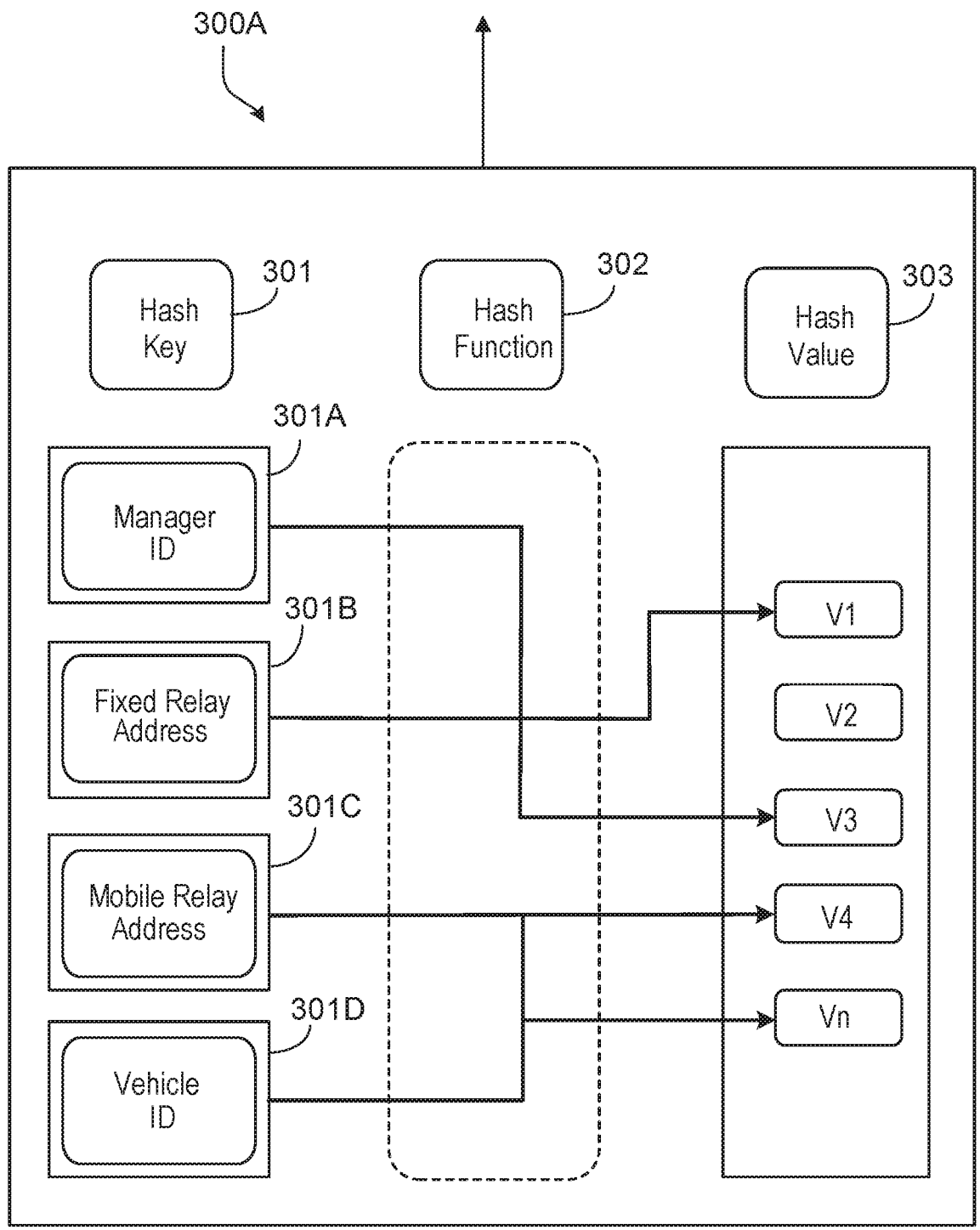
Figure 3B:
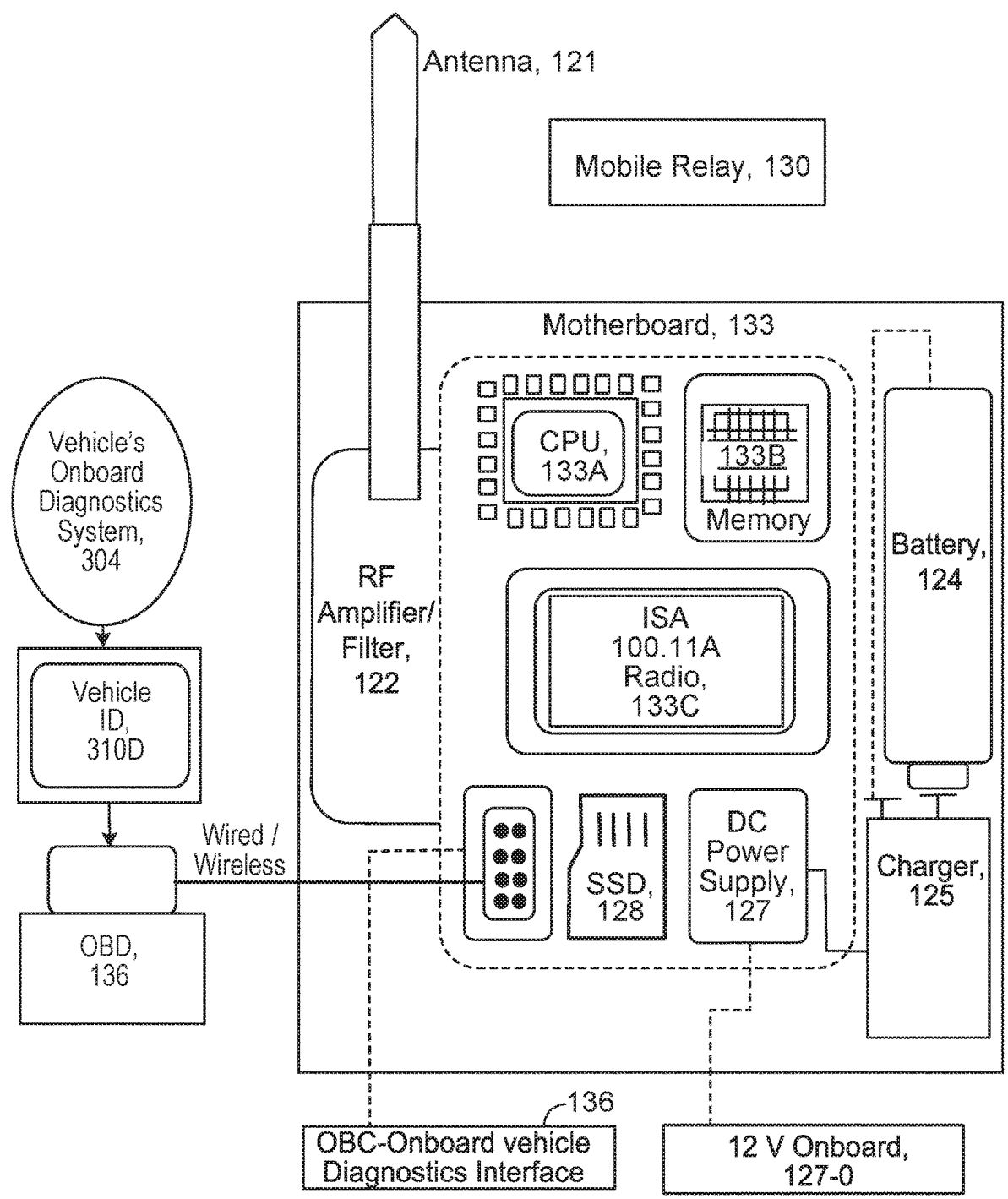
Figure 4A:
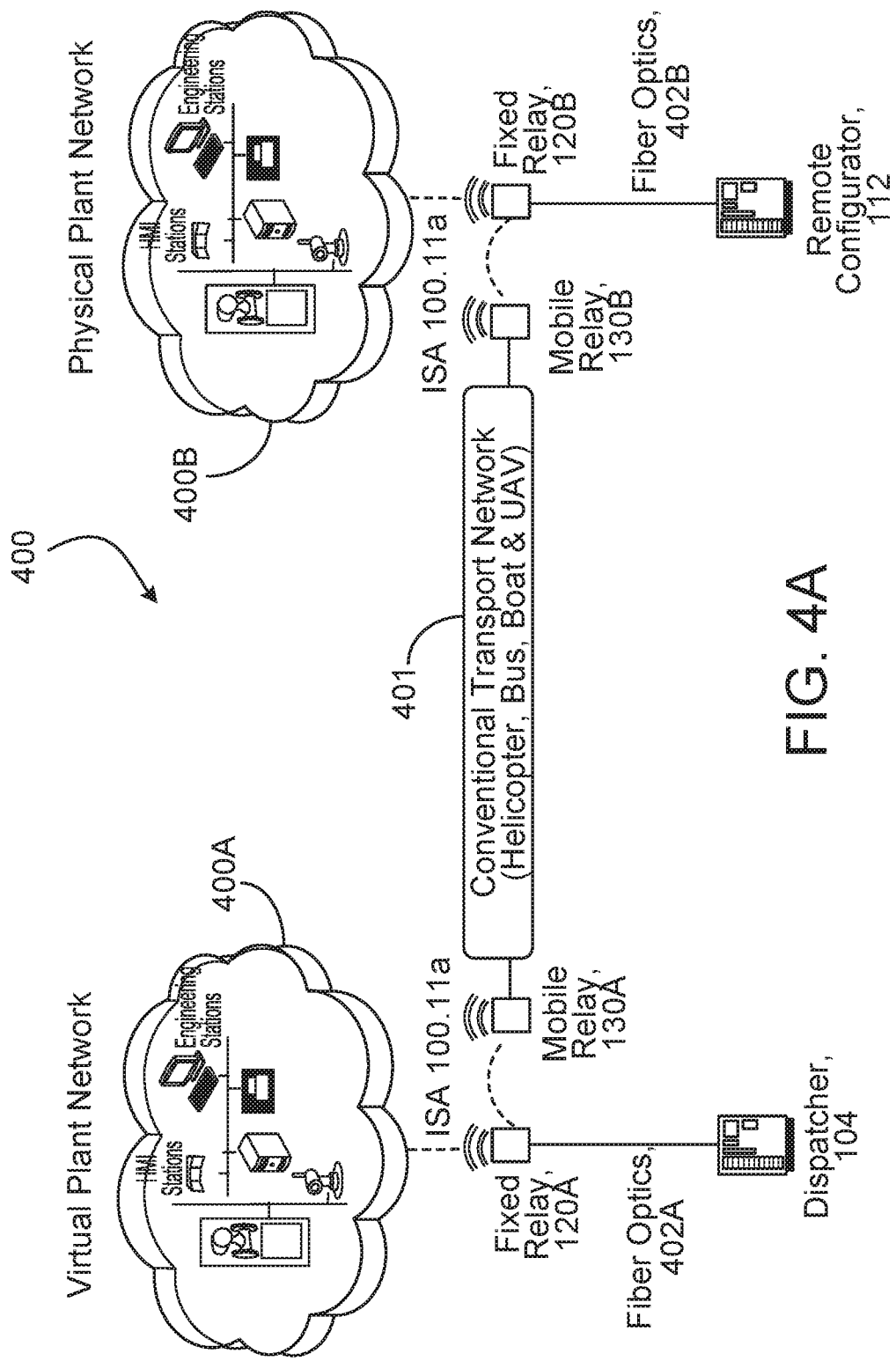
FIGS. 4A and 4B illustrate examples of field devices and systems for a virtualized layout according to an implementation of the present disclosure.
Figure 4B:
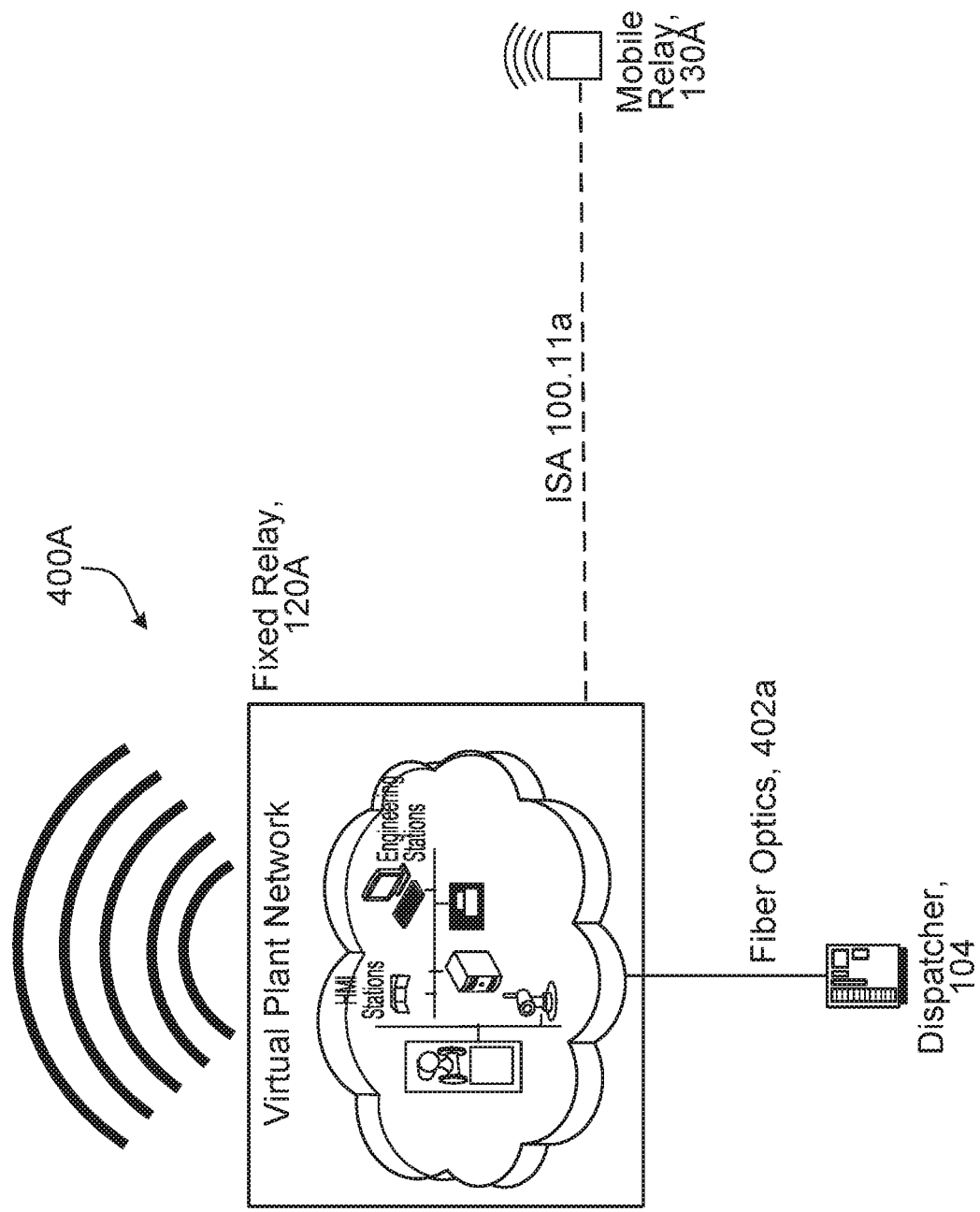
Figure 4C:
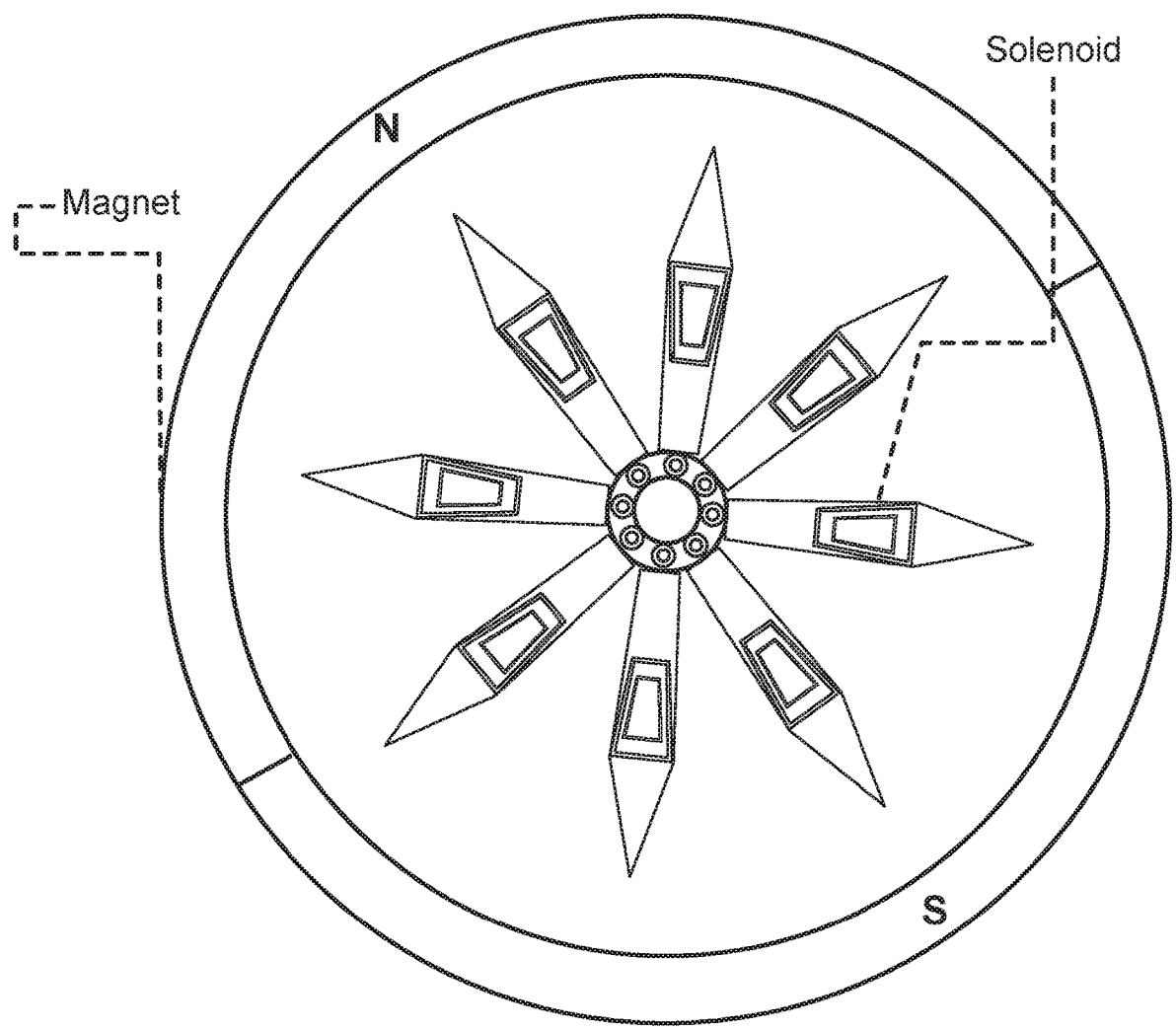
FIGS. 4C and 4D provide examples of extending battery operation for UAV to perform industrial site visits to remote facilities.
Figure 4D:
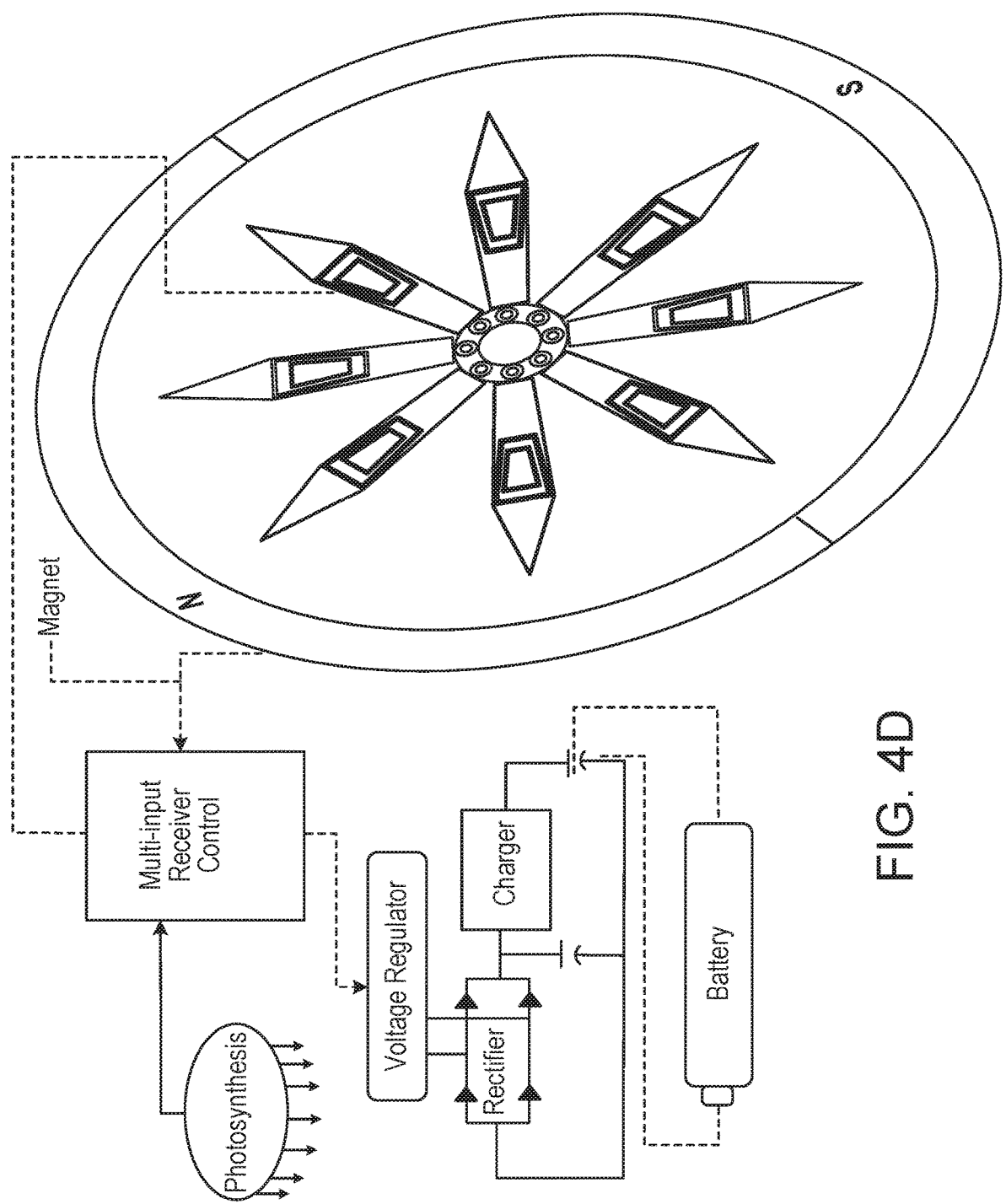
Figure 5A:
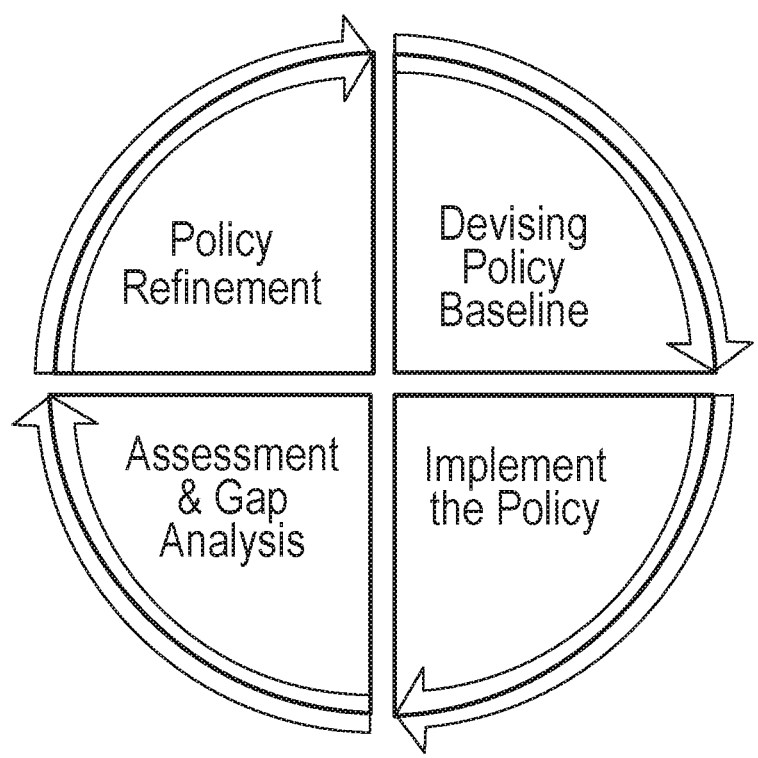
FIGS. 5A and 5B shows examples of operational cycles to establish multi-vector management for isolated process control, according to an implementation of the present disclosure.
Figure 5B:
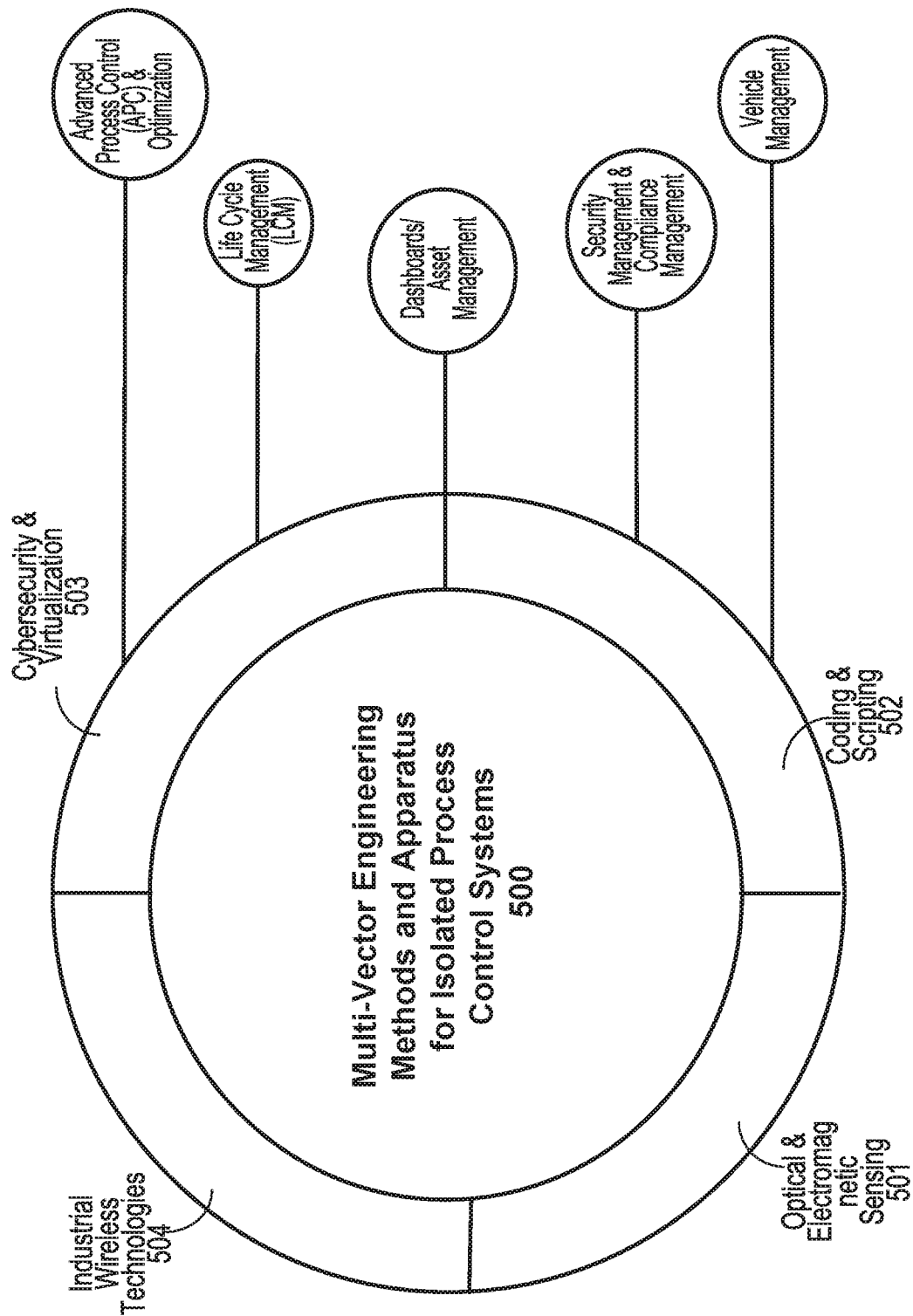
Figure 6:
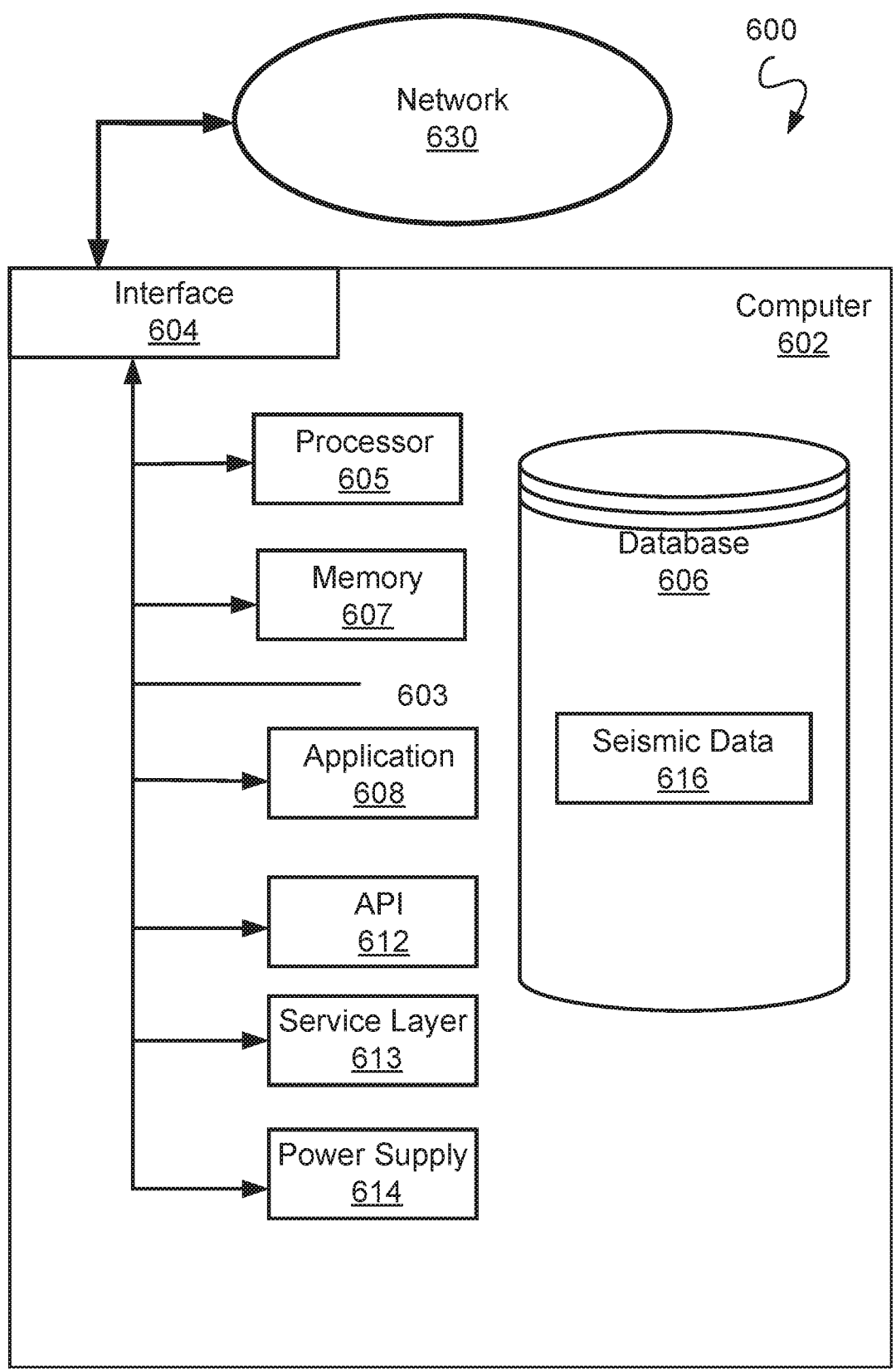
FIG. 6 is a block diagram illustrating an example of a computer system used to provide computational functionalities associated with described algorithms, methods, functions, processes, flows, and procedures, according to an implementation of the present disclosure.

FIGS. 2A to 2B illustrate examples of flow charts according to some implementations. FIGS. 3A to 3C supplements the flow charts of FIGS. 2A to 2B with examples of device authentication and security classification of the engineering packages. FIGS. 4A to 4I) provide various examples of virtualizing control systems engineering and management for an industrial operation with remote facilities. FIGS. 5A to 5B provides additional examples of a refinement process for the virtualization configuration. FIG. 6 shows an example of a server computer in the context of this disclosure.

Referring to FIGS. 2A and 2B, respectively showing example process charts 200A and 200B, after the process commences (201), a remote engineering package may be assembled on a server computer, for example, dispatcher 104. In some instances, the assembling process can be interactive. In one illustration, a human validation tests of the remote engineering package are carried on local test environment, for example, using the on-board virtual server as a virtual lab 129 to simulate the effects of the remote engineering package on the remote facilities (203). The results of the simulation is inspected (204). If the results are not successful, more tests and validations may be performed (203). If the results are successful, the dispatcher 104 formally assembles the engineering package (205). In one illustration, the dispatcher 104 may select execution script (205A), attach support files (205B), and perform a hash function (205C). Support files can include information to be pushed to remote facilities. Examples include control systems logic improvements, controller fine tuning or a security update/a firmware update, or an antivirus signature. Performing hash function can generate, for example, a checksum of the contents. The checksum may be additionally encrypted so that it can be used by the receiver to verify the contents as unaltered.

The dispatcher 104 from FIG. 1A, 1B may transmit the newly assembled engineering package to fixed relay 105 of FIG. 1A, 1B (206). From the fixed relay 105, the engineering package may be relayed via an ISA 100.11a link with a hash function performed (207) so that the engineering package, along with a hash function output of the engineering package, are transmitted to mobile relay 106 (208). The mobile relay 106 may verify the engineering package (209). In particular, the mobile relay 106 may verify the execution script in the payload of the engineering package as among those whitelisted as safe (209C). The mobile relay 106 may also perform cyclic redundancy check (CRC) on the data component of the engineering package which may include file attachments (209B). In this way, the authenticity of the relay from which the engineering package is received can be verified. In a similar vein, the mobile relay 106 may also verify the hash value to verify the integrity of the engineering package (209A). Results of the verification may be determined (210). If the results are successful, the mobile relay may acknowledge the success by transmitting a success flag through fixed relay 104 to alert the control system engineer at dispatcher 104. If the results are not successful, the mobile relay may acknowledge the failure by transmitting a failure flag through fixed relay 104 to alert the control system engineer at dispatcher 104. In the case of transmission failure, the control system engineer at dispatcher 104 then has the option of re-assembling an engineering package for retransmission.

In this flow chart, the control system engineer does not have to specify the exact vehicle or exact delivery schedule for transmitting the engineering package. Instead, after the engineering package is assembled for transmission, implementations described in this disclosure can rely on pre-existing vehicle schedules to have the engineering package delivered to the intended destination address. In some instances, the engineering package may arrive through multiple hops along the way. In other words, the remote destination is virtualized as an address for purposes of the delivery.

When the transport vehicle approaches the remote installation (for example, boat approaching multi-pier port), sensors on-site may detect the approach of the vehicle (212) and can be used to guide the boat into the right docking pier. At this point, fixed relay 109 at remote site 110 validates approaching vehicle's identity and performs access authorization for the approaching vehicle (213). Results of the validation and authorization are generated (214).

If the results are successful, the vehicle's on-board diagnostics (OBD) information is downloaded and a hash is performed (215). OBD is an automotive standard interface to vehicle's self-diagnostic and reporting platform. OBD systems provides access to multitude of vehicle's information including the status of operation conditions and alerts from various vehicle subsystems. The OBD status information may be downloaded to OBD interface 136 of the mobile relay module on the transport vehicle. Meanwhile, fixed relay 109 at remote site 110 may open the gate to allow the vehicle to enter (216). Subsequently, approach coordinates can be calculated and results passed to captain or driver dashboard on the transport vehicle to allow the vehicle to dock at the intended facility location at remote site 110 (217). As to the OBD status information downloaded at the mobile relay on the transport vehicle, the OBD information may be transmitted to fixed relay 109 (218), The OBD information may then be transmitted to corporate Transportation Management Suite (TMS) server (219). Corporate-level Transportation Management System can be used to histories data gathered from transportation vehicles that can be later analyzed to provide proactive maintenance and performance improvements (i.e. route calculations and asset utilizations statistics).

If the results are not successful, fixed relay 109 may engage gate protection mechanism to deny entry of the transport vehicle (220). Fixed relay 109 may then transmit failure flag through an alternative route to alert administrator at central site 101 (221), The transport vehicle's information may be recorded; and the time and date of the incident may be registered (222). Such information may be included in the report to central site 101. In one illustration, such information may be transmitted along with the OBI) information to corporate Transportation Management Suite TMS server (219).

Some implementations utilize a custom hash function to in an effort to strength security when transferring the "engineering" package from a fixed relay to a mobile relay or vice versa. For illustration, a hash function can be used to map data of arbitrary size to data of fixed size. The values returned by a hash function are called hash values, hash codes, digests, or simply hashes, FIG. 3A shows example 300A of projecting hash key 301 through hash function 302 to generate hash value 303. In some implementations, the hash function utilizes four inputs: namely, manger identification (ID) 301A, fixed relay address 301B, mobile relay address 301C, and vehicle ID 301D. These examples are used as hash value 301 on which hash function 302 is performed to generate respective hash values 303, including V1, V2, V3, and Vn. Further referring to FIG. 3B, vehicle ID 301D can be obtained through a wired or wireless interface on the vehicle's on-board diagnostics (OBD) interface 136. For context, OBD is an automotive standard interface to vehicle's self-diagnostic and reporting platform. OBD system 304 provides access to multitude of vehicle's information including the status of operation conditions and alerts from various vehicle subsystems. In this illustration, the OBD system 304 transmits information encoding vehicle ID 301D through OBD interface 136 of mobile relay module 130.

In various implementations, both fixed relay and mobile relay utilize industry wireless standards ISA 100.11a or wireless HART. These standard represent exemplary industrial wireless technologies using Institute of Electrical & Electronic Engineers (IEEE) 802.15.4-compatible Direct-Sequence Spread Spectrum (DSSS) radios. Operating in the 2.4 GHz ISM radio band, both WirelessHART and ISA100.11a provide full descriptions of the communication stacks specifications and use similar graph routing, source routing, security and centralized network management functions. However, WirelessHART is based on the HART communication protocol and user layer which has been in existence since the late 1980s. WirelessHART design criteria included integrated security, high availability, centralized management and support for upward and downward interoperability with previous and future releases of the HART protocol. On the other hand, ISA100.11a was developed by International Society of Automation (ISA) with the collaboration of 20,000+ automation professionals from various industries. ISA100.11a is designed to support a wide range of wireless industrial plant facilities and functions such as process and factory automation. ISA100.11a has been designed to include flexibility, support for multiple applications, high reliability and integrated security such as AES 128-bit and elliptic key encryption technologies. ISA100.11a provides full support for open standards such as IPv6 and UDP and defines the protocol stack, system management and security functions for use over low-power, low-rate wireless control systems.

In implementations adopting either of these wireless, these implementations can be complemented with security measures aboard the operating system and hardware of both the fixed and the mobile relays. Both relays will be equipped with a whitelisting mechanism that will control "what" package to install. Referring to FIG. 3C, this whitelisting mechanism documents certain command structures as "whitelisted" for pre-defined operations implemented directly in hardware. As a result, such operations cannot be altered or modified by external intruders such as hackers or malware. The command whiten sting and encoding is performed in separate channel can preserve data integrity by preventing potential "spillovers" and data contamination. In addition, the wireless transmission is constrained by power and distance to ensure that data replication can only occur within the specific boundaries controlled by the system specification.

Once the command is received and encoded by a relay, the relay will first double check integrity of the received command by verifying the legitimacy of the command prior to transmitting the received command to a counterpart relay. In one instance, once the first relay receives the encoded command, the first relay will verify the legitimacy of the encoded command prior to acting upon the command. If the encoded command is valid, the first relay will submit an application request to obtain data from a second relay where the encoded command will be replicated over to the onboard SSD. Additionally a hashing function that supports multiple proprietary input keys can be implemented to verify the identity and authenticity of both sender and receiver relay prior to the establishment of any data transfer.

Various implementations address system security and reliability. Some implementations incorporate hardware based whiten sting. In these implementations, each hardware component i.e. CPU, memory, I/O interfaces is assigned a hardware digital ID by which communication in or out of the component must be signed with and verified against. This mechanism can protect the system against intervention or manipulation by virtue of hardware components.

Software whitelisting is another aspect of self-protecting measures in some implementations. Here, software whitelisting can safeguard that each software component i.e. Operating System (OS), Applications plugins, I/O drivers etc. are digitally identified and verified. The measure will protect the system against intervention or manipulation by virtue of software components.

Another aspect of self-protecting measures is a built-in methodology to protect against device tampering by installing a protective "seal" on the box. The seal is electronically, guided and operated so that if broken (for example, when opening the box), a flag (for example, an electronic flag) is sent to the "Hardware Whitelisting" subroutine. The seal logic and mechanism is powered by an internal battery to maintain continuous operations even if the device is unplugged from wall power.

Still another aspect of self-protecting measures is a built-in anomaly-based intrusion detection system. The system is designed to detect system intrusions by monitoring system activity and categorizing such incident as either normal or abnormal. The system may employ a neural (fuzzy) logic that learns and stores patterns of acceptable system behavior so that the system will proactively cut the traffic upon the detection of suspicious behavior.

Yet another aspect of self-protecting measures is a built-in on/off switch that controls enabling/disabling remote access and configuration of the device using secure shell (SSH) and secure hypertext transmission protocol (HTTPS). This measure may further complement other protection mechanisms for the device after the device has been fully configured. In an "Off" position, the device will not accept any 10 level request for management.

Because the data is being transported via regular transport that is potential to accidents, failure, thefts or any other factor that can contribute to the potential loss of control over custody, implementations may incorporate a self-destruct mechanism that can be triggered via any factor such as time, or identity. The self-destruct mechanism utilizes the onboard battery to carry on a disk sanitization process to wipe it clean and permanently erase all captured information.

Some implementations enhance system availability and reliability by a dual bus architecture. The dual bus architecture encompasses dual CPU or dual memory, thereby in reality, giving rise to two devices working as one with built in-synchronizing circuitry.

Some implementations enhance efficiency by data buffering and compression. These implementations encompass a self-restoration subroutine so that in the event configuration is lost or damaged, such information can easily be restored from a backup point on a "flash" memory or from any storage location.

Some implementations may further operate as per a pre-configured schedule coherent with Transportation Management Suite (TMS) and corporate billing working schedule. The implementations may improve the communication link usage and also enhance cybersecurity as the system will be mostly off during a 24-hour period.

Some implementations may guard against adverse weather conditions by (i) providing weather proof and vandal proof housing for installation in outdoors or in relatively hostile environment, (ii) providing sturdy mounting is provided for outdoors installation to avoid potential vibration, (iii) designing system mount to support the maximum weight of system and enclosure assemblies, (iv) supporting stainless steel enclosures/housing for systems' protection in severe corrosive environments, and (v) supporting grounding terminal.

Referring to the example 400 in FIGS. 4A to 4D, the entire isolated plant facility can be virtualized on the fixed relay 120A which is connected to dispatcher 104 at central site 10. As a result, a virtual plant facility 400A is formed that leverages existing physical plant facility 400B. In more detail, dispatcher 104, through fiber optics 402A, is connected to fixed relay 120A. Through a verified link predicated on various wireless technologies, fixed relay 120A is connected to mobile link 130A, which is mounted on a transport vehicle of a legacy transport system 401. The transport vehicle may carry the engineering package via the legacy transport system 401 to remote site 110, In transit, the engineering package may be relayed to other transport vehicles that can provide better connectivity to remote site 110. On approaching remote site 110, mobile relay 130B on the transport vehicle engages in communication with fixed relay 120B at remote site for authentication and verification before delivery of the engineering package. If the transport vehicle is verified and the engineering package is validated, then the engineering package may be delivered to remote configurator 112. The engineering package may then be unpacked so that the intelligent agent contained in a script can be installed. In this example 400, the system manager can connect to a time snapshot of the actual design configuration of the remote site 110. Once connected, the manager can perform live update on any host in the virtualized plant facility and commit changes before existing the virtual interface. The fixed relay 120 A will synchronize any changes made to the virtual plant engine with the "real" physical configuration via the updates carried by the conventional transport mechanism of choice, be it a helicopter, a bus, a boat or a UAV. The visualization gives the manager a better user experience for seeing the remote node and sensing the nodes reactions to the subject change. Implementations can save time and effort when compared to the previous methodology.

Some implementations may facilitate the collection of Industrial Control Systems (ICS) security compliance assessment information, by recording ICS security configuration in a database. The database is populated and updated by automated scripting of a passive package. In one example, this automated scripting involves a subroutine that executes on a pre-defined interval, and outputs the result into a file format which is compatible with the target database. In this example, a special account with administrative privilege can be used for this purpose of running the script. In this example, the hardware resources utilization by the script and the polling cycle can be kept below a threshold lest plant operation might be negatively affected. For security, considerations, the script details and its areas of access are validated with the vendor. As a passive engineering package, such script only fetches the requisite information and outputs such information into a compatible format with the intended warehousing database. Correlation or data analysis may be performed later by the corporate central security compliance tool. The collection subroutine may utilize tools such as Windows Management Instrumentation (WMI) scripting, which enables the collection of computer management data from many sources and makes such data accessible by using standard interfaces. WMI can also be used to set configuration details and detect changes in the configuration using WMI events. WMI or any other tools or platforms could be utilized to fetch the required information based on a pre-set interval using systems scheduler. The output may be customized depending on the target database format.

Some implementations can provide data transfer, virtualization and replication using Unmanned Aerial Vehicle (UAV). The use of UAV can be extended beyond simple data transfer. Considering the ability to fly numerous numbers of individual UAV's, some UAV vehicles can be grouped to provide optimization and redundancy in data, route selection and extended coverage of additional sites. Additionally, the UAV can be optimized by extending its battery power using methods such as simple their blades as solenoid rotating in a magnet field, thus obtaining the ability to cover more distance on a single charge.

In another implementation, a fixed relay (for example, fixed relay 105 from FIG. 1A) may include a RAID (Redundant Array of Independent Disks) controller. A RAID controller is a software or hardware device used to manage physical hard disk drives in a computer and represents these drives as a logical unit. A controller offers a level of abstraction between an operating system and the physical drives. A RAID controller can be used for a number of data protection schemes called RAID levels, can be defined. As part of this disclosure, the RAID controller is implemented as part of the fixed relay configuration because the RAID controller can communicate with a pre-defined number of storage devices attached to the relay. Additionally, some of the RAID principles can be re-adapted to utilize mobile UAV based storage to provide optimum performance and data protection. For example, in RAID 5 configuration, data and parity is distributed over four disks, so that if one disk fails, the lost data can be reconstructed from the disk which still maintains the parity for the faulty drive. In the UAV example, one or more UAV's can be programmed to visit more than one site and accordingly save data for as many sites as it can visit. In the event of losing one UAV, the data can be obtained from another UAV that had already visited the site and collected its data.

Implementations described by this disclosure address security concerns when industrial facilities could be located hundreds of miles away from the main plant facility near the boarders or in the middle of the sea. The distant location is primarily dictated by process factors beyond the control of asset owner. Such situation presents a real management challenge in keeping these systems optimized, fine-tuned, updated and protected against vulnerabilities and cybersecurity threats. As illustrated in FIGS. 5A and 5B, the disclosure documents various implementations of a multi-vector management paradigm 500 predicated on various components including optical and electromagnetic sensing 501, coding and scripting features 502, cybersecurity and visualization toolset 503, and industrial wireless technologies 504. These components drive various goals of advanced process controls, security management, life-cycle management, asset management, compliance assessment, and vehicle management. Through interactive and iterative refinement, this paradigm 500 achieves various goals of devising policy, baseline, assessment & gap analysis, policy refinement, and implementation of the devised/refined policy. When policy baseline is devised, new set of rules are being added or removed to provide baseline guidance. The addition or removal of security controls are based on comparative studies, industry trends and corporate directions. Special considerations may be taken prior to implementation process to minimize interruption to operations. For example, legacy systems may not have the minimum resources requirement to accept those new operational set-points and security controls. Systems in remote or isolated areas may require logistics and travel arrangements and extended time of implementation. Compliance assessment are designed to gauge the level of adherence and implementation rate of the security policy. Deltas that exist between the policy controls and implementation level may be examined and analyzed to determine whether the security policy should be modified or tuned. Based on the outcome of the compliance assessment process and the afterward analysis, the policy may be modified and fined tuned. As the policy changes, however, the expectation by the security operation center and ultimately executive management is that "all" sites are to "immediately" comply with this change no matter how small there change is to preserve uniformity across the entire organization. Subsequent compliance assessment practices are carried over on all facilities to gauge the respective level of compliance with the new changes made in the policy. Compliance level and gap analysis reports are accordingly prepared and shared with executive management. The disclosed system and method are fully capable of address unique issues in such operative environment.

FIG. 6 is a block diagram illustrating an example of a computer system 600 used to provide computational functionalities associated with described algorithms, methods, functions, processes, flows, and procedures, according to an implementation of the present disclosure. The illustrated computer 602 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 602 can comprise a computer that includes an input device, such as a keypad, keyboard, touch screen, another input device, or a combination of input devices that can accept user information, and an output device that conveys information associated with the operation of the computer 602, including digital data, visual, audio, another type of information, or a combination of types of information, on a graphical-type user interface (UI) (or GUI) or other UI.

The computer 602 can serve in a role in a computer system as a client, network component, a server, a database or another persistency, another role, or a combination of roles for performing the subject matter described in the present disclosure. The illustrated computer 602 is communicably coupled with a network 630. In some implementations, one or more components of the computer 602 can be configured to operate within an environment, including cloud-computing-based, local, global, another environment, or a combination of environments.

The computer 602 is an electronic computing device operable to receive, transmit, process, store, or manage data and information associated with the described subject matter. According to some implementations, the computer 602 can also include or be communicably coupled with a server, including an application server, e-mail server, web server, caching server, streaming data server, another server, or a combination of servers.

The computer 602 can receive requests over network 630 (for example, from a client software application executing on another computer 602) and respond to the received requests by processing the received requests using a software application or a combination of software applications. In addition, requests can also be sent to the computer 602 from internal users, external or third-parties, or other entities, individuals, systems, or computers.

Each of the components of the computer 602 can communicate using a system bus 603. In some implementations, any or all of the components of the computer 602, including hardware, software, or a combination of hardware and software, can interface over the system bus 603 using an application programming interface (API) 612, a service layer 613, or a combination of the API 612 and service layer 613. The API 612 can include specifications for routines, data structures, and object classes. The API 612 can be either computer-language independent or dependent and refer to a complete interface, a single function, or even a set of APIs. The service layer 613 provides software services to the computer 602 or other components (whether illustrated or not) that are communicably coupled to the computer 602. The functionality of the computer 602 can be accessible for all service consumers using this service layer. Software services, such as those provided by the service layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 602, alternative implementations can illustrate the API 612 or the service layer 613 as stand-alone components in relation to other components of the computer 602 or other components (whether illustrated or not) that are communicably coupled to the computer 602. Moreover, any or all parts of the API 612 or the service layer 613 can be implemented as a child or a sub-module of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602. The interface 604 is used by the computer 602 for communicating with another computing system (whether illustrated or not) that is communicatively linked to the network 630 in a distributed environment. Generally, the interface 604 is operable to communicate with the network 630 and comprises logic encoded in software, hardware, or a combination of software and hardware. More specifically, the interface 604 can comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors can be used according to particular needs, desires, or particular implementations of the computer 602. Generally, the processor 605 executes instructions and manipulates data to perform the operations of the computer 602 and any algorithms, methods, functions, processes, flows, and procedures as described in the present disclosure.

The computer 602 also includes a database 606 that can hold data for the computer 602, another component communicatively linked to the network 630 (whether illustrated or not), or a combination of the computer 602 and another component. For example, database 606 can be an in-memory, conventional, or another type of database storing data consistent with the present disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases of similar or differing types can be used according to particular needs, desires, or particular implementations of the computer 602 and the described functionality. While database 606 is illustrated as an integral component of the computer 602, in alternative implementations, database 606 can be external to the computer 602. As illustrated, the database 606 holds the previously described seismic data 616.

The computer 602 also includes a memory 607 that can hold data for the computer 602, another component or components communicatively linked to the network 630 (whether illustrated or not), or a combination of the computer 602 and another component. Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 or similar or differing types can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in the present disclosure. For example, application 608 can serve as one or more components, modules, or applications. Further, although illustrated as a single application 608, the application 608 can be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or another power management functionality). In some implementations, the power-supply 614 can include a power plug to allow the computer 602 to be plugged into a wall socket or another power source to, for example, power the computer 602 or recharge a rechargeable battery.

There can be any number of computers 602 associated with, or external to, a computer system containing computer 602, each computer 602 communicating over network 630. Further, the term "client," "user," or other appropriate terminology can be used interchangeably, as appropriate, without departing from the scope of the present disclosure. Moreover, the present disclosure contemplates that many users can use one computer 602, or that one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−

R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-assisted method to manage a plant facility with remote sites that are separated from a central site, the method comprising:
   assembling, by a server computer located at the central site of the plant facility, an engineering package addressed to a particular remote site of the plant facility, the engineering package comprising a command script and a data component; and
   dispatching, by the server computer located at the central site of the plant facility and through a transport network of one or more transport vehicles, the engineering package to the particular remote site such that, when the engineering package arrives with a particular transport vehicle at the particular remote site, the command script is extracted and executed by one or more computing devices at the particular remote site to cause the one or more computing devices to perform tasks of managing site operations at the particular remote site as if a human control systems engineer is present to perform such tasks on-site.

2. The computer-assisted method of claim 1, wherein, when the command script is executed, the engineering package unpacks the data component.

3. The computer-assisted method of claim 1, wherein the data component encodes one or more of:
a set-point change, a PID (ProportionalIntegralDerivative) controller tuning command, an OLE (Object Linking and Embedding) for Process Control (OPC) alarm management request, a system update, a security patch, or an update firmware.

4. The computer-assisted method of claim 1, further comprising:
when the engineering package arrives with the particular transport vehicle at the particular remote site, the command script is extracted and executed to perform at least one of: pushing commands or collecting information at the particular remote site by polling computers, controllers, instruments and field devices at the particular remote site.

5. The computer-assisted method of claim 4, further comprising:
receiving, by the server computer at the central site, the information collected from the particular remote site.

6. The computer-assisted method of claim 5, further comprising:
based on the information received, assembling, by the server computer at the central site, an additional engineering package to remedy deficiencies at the particular remote site as revealed by the information received; and
dispatching, by the server computer located at the central site of the plant facility and through the transport network of one or more transport vehicles, the additional engineering package to the particular remote site.

7. The computer-assisted method of claim 1, wherein dispatching the engineering package comprises:
dispatching, by the server computer at the central site, the engineering package from a first fixed relay module at the central site to a mobile relay module mounted on a transport vehicle of the transport network, wherein when the engineering package arrives with the particular transport vehicle at the particular remote site, the engineering package is received by a second fixed relay module at the particular remote site.

8. The computer-assisted method of claim 7, wherein dispatching the engineering package from the first fixed relay module to the mobile relay module is conducted according to one or more of: an ISA 100.11a protocol, a Wireless HART protocol, an induced vibrations flux, a direct wire harness, or a fiber optic harness.

9. The computer-assisted method of claim 7, wherein dispatching the engineering package from the first fixed relay module to the mobile relay module is conducted by transmitting the engineering package from a first IEEE 802.15.4-compatible Direct-Sequence Spread Spectrum (DSSS) radio on the first fixed relay module to a second IEEE 802.15.4-compatible Direct-Sequence Spread Spectrum (DSSS) radio on the mobile relay module.

10. The computer-assisted method of claim 7, wherein dispatching the engineering package from the first fixed relay module and the mobile relay module comprises:
generating, by the server computer at the central site, a hash value for the engineering package; and
attaching, by the server computer at the central site, the hash value to the engineering package being assembled.

11. The computer-assisted method of claim 10, wherein generating the hash value comprises:
performing, by the server computer at the central site, a hash function by using, as hash keys, one or more of: an identification of a manager of the particular remote site, an address of the first fixed relay module, an address of the second fixed relay module, an address of the mobile relay module, and an identification of the transport vehicle.

12. A computer system located at a central site of a plant facility and comprising a processor and at least one memory, wherein the processor is configured to:
assemble an engineering package, the engineering package addressed to a particular remote site of the plant facility and comprising a command script and a data component; and
dispatch the engineering package, through a transport network of one or more transport vehicles, to the particular remote site such that, when the engineering package arrives with a particular transport vehicle at the particular remote site, the command script is extracted and executed by one or more computing devices at the particular remote site to cause the one or more computing devices at the particular remote site to perform tasks of managing site operations at the particular remote site for routine maintenance as if a human control systems engineer is present to perform such tasks on-site.

13. The computer system of claim 12, wherein the processor is further configured to:
when the command script is executed at the particular remote site, the engineering package unpacks the data component.

14. The computer system of claim 12, wherein the data component encodes one or more of:
a set-point change, a PID (proportional-integral-derivative) controller tuning command, an OLE (Object Linking and Embedding) for Process Control (OPC) alarm management request, a system update, a security patch, or an update firmware.

15. The computer system of claim 12, wherein the processor is further configured to:
when the engineering package arrives with the particular transport vehicle at the particular remote site, the command script is extracted and executed by one or more computing devices at the particular remote site to cause the one or more computing devices to perform at least one of: pushing commands or collecting information at the particular remote site by polling at controllers, instruments, field devices and computers at the particular remote site.

16. The computer system of claim 15, wherein the processor is further configured to:
receive the collected information from the particular remote site.

17. The computer system of claim 16, wherein the processor is further configured to:

based on the information received, assemble an additional engineering package to remedy deficiencies at the particular remote site as revealed by the information received; and dispatch, through the transport network of one or more transport vehicles, the additional engineering package to the particular remote site.

18. The computer system of claim 12, wherein the processor is further configured to:

transmitting the engineering package from a first IEEE 802.15.4-compatible Direct-Sequence Spread Spectrum (DSSS) radio on a first fixed relay module at the central site to a second IEEE 802.15.4-compatible Direct-Sequence Spread Spectrum (DSSS) radio on a mobile relay module mounted on a transport vehicle of the transport network according to one or more of: a ISA 100.11a protocol, a WirelessHART protocol, an induced vibration flux, a direct wire harness, or a fiber optic harness such that when the engineering package arrives with the particular transport vehicle at the particular remote site, the engineering package is received by a second fixed relay module at the particular remote site.

19. The computer system of claim 18, wherein the processor is further configured to:

generate a hash value for the engineering package; and attach the hash value to the engineering package being assembled.

20. The computer system of claim 19, wherein the processor is further configured to:

perform a hash function by using, as hash keys, one or more of: an identification of a manager of the particular remote site, an address of the first fixed relay module, an address of the second fixed relay module, an address of the mobile relay module, and an identification of the transport vehicle.

21. The computer-assisted method of claim 1, wherein the transport network of one or more transport vehicles comprises: an Unmanned Aerial Vehicle (UAV).

* * * * *

UNITED STATES PATENT AND TRADEMARK OFFICE
CERTIFICATE OF CORRECTION

PATENT NO. : 10,606,249 B2
APPLICATION NO. : 15/923370
DATED : March 31, 2020
INVENTOR(S) : Fouad M. Alkhabbaz and Osama Bakur Bahwal It is certified that error appears in the above-identified patent and that said Letters Patent is hereby corrected as shown below:

In the Claims

Column 23, Lines 17-18, Claim 3, delete "(ProportionalIntegralDerivative)" and insert -- (Proportional-Integral-Derivative) --.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*